(12) United States Patent
Combs et al.

(10) Patent No.: US 12,203,788 B2
(45) Date of Patent: Jan. 21, 2025

(54) FOOTWEAR EXPIRATION INDICATOR

(71) Applicants: Damon Combs, McMurray, PA (US); Kelly Combs, McMurray, PA (US)

(72) Inventors: Damon Combs, McMurray, PA (US); Kelly Combs, McMurray, PA (US)

(*) Notice: Subject to any disclaimer, the term of this patent is extended or adjusted under 35 U.S.C. 154(b) by 470 days.

(21) Appl. No.: 17/714,731

(22) Filed: Apr. 6, 2022

(65) Prior Publication Data

US 2022/0322781 A1 Oct. 13, 2022

Related U.S. Application Data

(60) Provisional application No. 63/172,254, filed on Apr. 8, 2021.

(51) Int. Cl.
| | | |
|---|---|---|
| *G01D 7/00* | (2006.01) | |
| *G01D 13/00* | (2006.01) | |
| *A43B 7/00* | (2006.01) | |

(52) U.S. Cl.
CPC ............. *G01D 7/005* (2013.01); *G01D 13/00* (2013.01); *A43B 7/00* (2013.01)

(58) Field of Classification Search
CPC .......... G01D 7/005; G01D 13/00; A43B 7/00; A43B 13/04; A43B 1/0027
See application file for complete search history.

(56) References Cited

U.S. PATENT DOCUMENTS

| | | | |
|---|---|---|---|
| 4,817,304 A * | 4/1989 | Parker | A43B 13/20 36/114 |
| 7,353,770 B2 | 4/2008 | Sanguinetti | |
| 7,735,351 B2 * | 6/2010 | Profit | G01M 7/08 73/11.04 |
| 8,280,681 B2 | 10/2012 | Vock et al. | |
| 2006/0162421 A1 * | 7/2006 | Mess | G01P 15/06 73/12.01 |
| 2007/0125295 A1 * | 6/2007 | Sanguinetti | A43B 13/12 116/200 |
| 2009/0095050 A1 * | 4/2009 | Profit | G01M 7/08 73/11.04 |
| 2016/0219972 A1 | 8/2016 | Davies | |
| 2017/0258173 A1 * | 9/2017 | Johnson | A43B 3/34 |
| 2022/0284199 A1 * | 9/2022 | Arno | G06K 7/10297 |
| 2022/0322781 A1 * | 10/2022 | Combs | G01D 13/00 |

FOREIGN PATENT DOCUMENTS

| | | | |
|---|---|---|---|
| DE | 202023106208 U1 * | 1/2024 | |
| FR | 2795924 B1 | 1/2002 | |

* cited by examiner

*Primary Examiner* — Yaritza Guadalupe-McCall
(74) *Attorney, Agent, or Firm* — The Webb Law Firm

(57) ABSTRACT

A footwear indicator is discloses capable of providing an indication of the degree of wear on a footwear, for example, an athletic or other type of shoe.

22 Claims, 2 Drawing Sheets

FOOTWEAR EXPIRATION INDICATOR

CROSS-REFERENCE TO RELATED APPLICATION

The present application claims priority to U.S. Provisional Patent Application No. 63/172,254, entitled "Footwear Expiration Indicator", filed Apr. 8, 2021, the entire disclosure of which is hereby incorporated by reference in its' entirety.

BACKGROUND OF THE INVENTION

Field of the Invention

The present invention is directed towards a footwear indicator for determining wear or lifespan of the footwear such as shoes, athletic shoes, or other articles.

SUMMARY OF THE INVENTION

Footwear, for example, athletic footwear, is developed to absorb stress on the wearer such that the foot, ankle, leg, or back, for example, are spared from the stress during daily activities such as, but not limited to, standing, walking, or running. The manufacturing of footwear has developed such that most daily activities now have footwear that has been specifically designed for that activity.

Footwear in general, athletic footwear in particular, tend to wear down over time with usage. For example, the constant impact and shear forces on the bottom or outer sole against the footwear surface may wear away the bottom or outer sole. Moreover, the forces exerted between the foot and the cushioning support within the footwear may flatten or wear down the cushioning support. This flattening or wearing down may decrease the footwear's mechanical compatibility or stress reducing capabilities. Prolonged wearing and use of footwear having diminished mechanical compatibility or stress reducing capabilities may result in pain or injury in the subject wearing the footwear. This pain or injury in the subject wearing the footwear may include, for example, chronic pain, stress fractures, or tendonitis. While it is possible to replace footwear, or replace the bottom or outer sole, it is not always apparent to the subject when the footwear has diminished mechanical compatibility or diminished stress reducing capabilities. Additionally, footwear is often discarded when the mechanical compatibility or stress reducing capabilities of the footwear remains intact.

Accordingly, there is a need for a footwear expiration indicator that allows a subject to determine when the footwear has diminished mechanical compatibility or diminished stress reducing capabilities to prevent injuries to the foot, ankle, leg, or back of a subject. Further, there is a need to be aware of the lifespan of footwear such that footwear is not discarded when the mechanical compatibility or stress reducing capabilities of the footwear is intact.

An object of certain embodiments of the present disclosure is to provide an indicator for visualizing wear on a shoe. In some embodiments, the indicator may include a housing having a tube. In some embodiment, the tube may have a top portion and a bottom portion. In further embodiments, a peg may be in contact with at least a portion of the top portion of the tube. In further embodiments, a receiver can be in contact with at least a portion of the bottom portion of the tube.

In some embodiments, the peg may include a top portion and a bottom portion. In further embodiments, the bottom portion may have an engagement portion.

In some embodiments, the housing may include an air pocket.

In further embodiments, the housing may be constructed from a material including, but not limited to polymers, copolymers, ethyl vinyl acetate, polyurethane, thermoplastic urethane, nylon, or combinations thereof. In some embodiments, the material can be plastic.

In some embodiments, the tube may be constructed from a material including, but not limited to, polymers, copolymers, ethyl vinyl acetate, polyurethane, thermoplastic urethane, nylon, or combinations thereof.

In some embodiments, the peg can be constructed from a material including, but not limited to, polymers, copolymers, ethyl vinyl acetate, polyurethane, thermoplastic urethane, nylon, or combinations thereof.

In some embodiments, the receiver can be constructed from a material including, but not limited to, polymers, copolymers, ethyl vinyl acetate, polyurethane, thermoplastic urethane, nylon, or combinations thereof.

In some embodiments, the housing can have a dimension. In further embodiments, the housing dimension can be in a range from about 0.3 centimeters to about 5.0 centimeters in length.

In some embodiments, the tube can have a dimension. In further embodiments, the tube dimension can be in a range from about 0.2 centimeters to about 2.0 centimeters.

In some embodiments, the peg can have a dimension. In further embodiments, the peg dimension can be in a range from about 0.2 centimeters to about 3.0 centimeters.

In some embodiments, the receiver can have a dimension. In further embodiments, the receiver dimension can be in a range from about 0.3 centimeters to about 2.5 centimeters.

In some embodiments, the peg may have one or more colors. In further embodiments, the one or more colors can be red, orange, yellow, green, blue, or a combination thereof.

In further embodiments, the indicator can be located in a layer of the shoe. In some embodiments, the indicator can be located in an ethylene-vinyl-acetate layer of the shoe.

In some embodiments, the indicator can be located on an inner or outer area of the shoe. In some embodiments, the indicator can be located within an area of the shoe. In further embodiments, the indicator can be located on the outer area of the shoe that is behind a heel of the shoe.

A further object of certain embodiments of the present disclosure is to provide a method of manufacturing an indicator for visualizing wear on a shoe. In some embodiments, the method may include providing an indicator for visualizing wear on a shoe. In some embodiments, the indicator may include a housing having a tube. In some embodiment, the tube may have a top portion and a bottom portion. In further embodiments, a peg may be in contact with at least a portion of the top portion of the tube. In further embodiments, a receiver can be in contact with at least a portion of the bottom portion of the tube.

In some embodiments, the method of manufacturing an indicator for visualizing wear on the shoe may include affixing the indicator in an area of the shoe. In further embodiments, the indicator can be located in a layer of the shoe. In some embodiments, the indicator can be located in an ethylene-vinyl-acetate layer of the shoe. In some embodiments, the indicator can be located on an inner or outer area of the shoe. In some embodiments, the indicator can be located within an area of the shoe. In further embodiments, the indicator can be located on the outer area of the shoe that is behind a heel of the shoe.

A further object of certain embodiments of the present disclosure is to provide a method of using an indicator for visualizing wear on a shoe. In some embodiments, the method may include providing an indicator for visualizing wear on a shoe. In some embodiments, the indicator may include a housing having a tube. In some embodiments, the tube may have a top portion and a bottom portion. In further embodiments, a peg may be in contact with at least a portion of the top portion of the tube. In further embodiments, a receiver can be in contact with at least a portion of the bottom portion of the tube.

In some embodiments, the method of using an indicator for visualizing wear on a shoe may include determining an expiration of the shoe. In further embodiments, determining the expiration of the shoe may include determining engagement of the peg with the receiver.

Various aspects of the present disclosure may be further characterized by one or more of the following clauses:

Clause 1: An indicator for visualizing wear on a shoe, comprising a housing having a tube, the tube having a top portion and a bottom portion, a peg in contact with at least a portion of the top portion of the tube, and a receiver in contact with at least a portion of the bottom portion of the tube.

Clause 2: The indicator of clause 1, wherein the peg comprises a top portion.

Clause 3: The indicator of clause 1 or 2, wherein the peg comprises a bottom portion.

Clause 4: The indicator of any one of clauses 1 to 3, wherein the bottom portion has an engagement portion.

Clause 5: The indicator of any one of clauses 1 to 4, wherein the housing comprises an air pocket.

Clause 6: The indicator of any one of clauses 1 to 5, wherein the housing comprises a material.

Clause 7: The indicator of clause 6, wherein the housing material is a polymer.

Clause 8: The indicator of clause 6, wherein the housing material is a copolymer.

Clause 9: The indicator of clause 6, wherein the housing material is ethyl vinyl acetate.

Clause 10: The indicator of clause 6, wherein the housing material is polyurethane.

Clause 11: The indicator of clause 6, wherein the housing material is thermoplastic urethane.

Clause 12: The indicator of clause 6, wherein the housing material is nylon.

Clause 13: The indicator of clause 6, wherein the housing material is polymers, copolymers, ethyl vinyl acetate, polyurethane, thermoplastic urethane, nylon, or combinations thereof.

Clause 14: The indicator of clause 6, wherein the housing material is plastic.

Clause 15: The indicator of any one of clauses 1 to 14, wherein the tube comprises a material.

Clause 16: The indicator of clause 15, wherein the tube material is polymers, copolymers, ethyl vinyl acetate, polyurethane, thermoplastic urethane, nylon, or combinations thereof.

Clause 17: The indicator of clause 15, wherein the tube material is a polymer.

Clause 18: The indicator of clause 15, wherein the tube material is a copolymer.

Clause 19: The indicator of clause 15, wherein the tube material is ethyl vinyl acetate.

Clause 20: The indicator of clause 15, wherein the tube material is polyurethane.

Clause 21: The indicator of clause 15, wherein the tube material is thermoplastic urethane.

Clause 22: The indicator of clause 15, wherein the tube material is nylon.

Clause 23: The indicator of any one of clauses 1 to 21, wherein the peg comprises a material.

Clause 24: The indicator of clause 23, wherein the peg material is polymers, copolymers, ethyl vinyl acetate, polyurethane, thermoplastic urethane, nylon, or combinations thereof.

Clause 25: The indicator of clause 23, wherein the peg material is a polymer.

Clause 26: The indicator of clause 23, wherein the peg material is a copolymer.

Clause 27: The indicator of clause 23, wherein the peg material is ethyl vinyl acetate.

Clause 28: The indicator of clause 23, wherein the peg material is polyurethane.

Clause 29: The indicator of clause 23, wherein the peg material is thermoplastic urethane.

Clause 30: The indicator of clause 23, wherein the peg material is nylon.

Clause 31: The indicator of any one of clauses 1 to 30, wherein the receiver comprises a material.

Clause 32: The indicator of clause 31, wherein the receiver material is polymers, copolymers, ethyl vinyl acetate, polyurethane, thermoplastic urethane, nylon, or combinations thereof.

Clause 33: The indicator of clause 32, wherein the receiver material is a polymer.

Clause 34: The indicator of clause 32, wherein the receiver material is a copolymer.

Clause 35: The indicator of clause 32, wherein the receiver material is ethyl vinyl acetate.

Clause 36: The indicator of clause 32, wherein the receiver material is polyurethane.

Clause 37: The indicator of clause 32, wherein the receiver material is thermoplastic urethane.

Clause 38: The indicator of clause 32, wherein the receiver material is nylon.

Clause 39: The indicator of any one of clauses 1 to 38, wherein the housing has a dimension.

Clause 40: The indicator of clause 32, wherein the housing dimension is in a range from about 0.3 centimeters to about 5.0 centimeters in length.

Clause 41: The indicator of clause 32, wherein the housing dimension is in a range from about 0.3 centimeters to about 4.0 centimeters in length.

Clause 42: The indicator of clause 32, wherein the housing dimension is in a range from about 0.3 centimeters to about 3.0 centimeters in length.

Clause 43: The indicator of clause 32, wherein the housing dimension is in a range from about 0.3 centimeters to about 2.0 centimeters in length.

Clause 44: The indicator of clause 32, wherein the housing dimension is in a range from about 0.3 centimeters to about 1.0 centimeters in length.

Clause 45: The indicator of clause 32, wherein the housing dimension is in a range from about 0.5 centimeters to about 5.0 centimeters in length.

Clause 46: The indicator of clause 32, wherein the housing dimension is in a range from about 1.0 centimeters to about 5.0 centimeters in length.

Clause 47: The indicator of clause 32, wherein the housing dimension is in a range from about 2.0 centimeters to about 5.0 centimeters in length.

Clause 48: The indicator of clause 32, wherein the housing dimension is in a range from about 3.0 centimeters to about 5.0 centimeters in length.

Clause 49: The indicator of clause 32, wherein the housing dimension is in a range from about 4.0 centimeters to about 5.0 centimeters in length.

Clause 50: The indicator of any one of clauses 1 to 49, wherein the tube has a dimension.

Clause 51: The indicator of clause 50, wherein the tube dimension is in a range from about 0.2 centimeters to about 2.0 centimeters.

Clause 52: The indicator of clause 50, wherein the tube dimension is in a range from about 0.2 centimeters to about 1.5 centimeters.

Clause 53: The indicator of clause 50, wherein the tube dimension is in a range from about 0.2 centimeters to about 1.0 centimeters.

Clause 54: The indicator of clause 50, wherein the tube dimension is in a range from about 0.2 centimeters to about 0.5 centimeters.

Clause 55: The indicator of clause 50, wherein the tube dimension is in a range from about 0.5 centimeters to about 2.0 centimeters.

Clause 56: The indicator of clause 50, wherein the tube dimension is in a range from about 1.0 centimeters to about 2.0 centimeters.

Clause 57: The indicator of clause 50, wherein the tube dimension is in a range from about 1.5 centimeters to about 2.0 centimeters.

Clause 58: The indicator of any one of clauses 1 to 57, wherein the peg has a dimension.

Clause 59: The indicator of clause 58, wherein the peg dimension is in a range from about 0.2 centimeters to about 3.0 centimeters.

Clause 60: The indicator of clause 58, wherein the peg dimension is in a range from about 0.2 centimeters to about 2.0 centimeters.

Clause 61: The indicator of clause 58, wherein the peg dimension is in a range from about 0.2 centimeters to about 1.0 centimeters.

Clause 62: The indicator of clause 58, wherein the peg dimension is in a range from about 0.2 centimeters to about 0.5 centimeters.

Clause 63: The indicator of clause 58, wherein the peg dimension is in a range from about 0.5 centimeters to about 3.0 centimeters.

Clause 64: The indicator of clause 58, wherein the peg dimension is in a range from about 1.0 centimeters to about 3.0 centimeters.

Clause 65: The indicator of clause 58, wherein the peg dimension is in a range from about 1.5 centimeters to about 3.0 centimeters.

Clause 66: The indicator of clause 58, wherein the peg dimension is in a range from about 2.0 centimeters to about 3.0 centimeters.

Clause 67: The indicator of clause 58, wherein the peg dimension is in a range from about 2.5 centimeters to about 3.0 centimeters.

Clause 68: The indicator of any one of clauses 1 to 67, wherein the receiver has a dimension.

Clause 69: The indicator of clause 68, wherein the receiver dimension is in a range from about 0.3 centimeters to about 2.5 centimeters.

Clause 70: The indicator of clause 68, wherein the receiver dimension is in a range from about 0.3 centimeters to about 2.0 centimeters.

Clause 71: The indicator of clause 68, wherein the receiver dimension is in a range from about 0.3 centimeters to about 1.5 centimeters.

Clause 72: The indicator of clause 68, wherein the receiver dimension is in a range from about 0.3 centimeters to about 1.0 centimeters.

Clause 73: The indicator of clause 68, wherein the receiver dimension is in a range from about 0.3 centimeters to about 0.5 centimeters.

Clause 74: The indicator of clause 68, wherein the receiver dimension is in a range from about 0.5 centimeters to about 2.5 centimeters.

Clause 75: The indicator of clause 68, wherein the receiver dimension is in a range from about 1.0 centimeters to about 2.5 centimeters.

Clause 76: The indicator of clause 68, wherein the receiver dimension is in a range from about 1.5 centimeters to about 2.5 centimeters.

Clause 77: The indicator of clause 68, wherein the receiver dimension is in a range from about 2.0 centimeters to about 2.5 centimeters.

Clause 78: The indicator of any one of clauses 1 to 77, wherein the peg has one or more colors.

Clause 79: The indicator of clause 78, wherein the one or more colors is red, orange, yellow, green, blue, or a combination thereof.

Clause 80: The indicator of clause 78, wherein the one or more colors is red.

Clause 81: The indicator of clause 78, wherein the one or more colors is orange.

Clause 82: The indicator of clause 78, wherein the one or more colors is yellow.

Clause 83: The indicator of clause 78, wherein the one or more colors is green.

Clause 84: The indicator of clause 78, wherein the one or more colors is blue.

Clause 85: The indicator of any one of clauses 1 to 84, wherein the indicator is located in a layer of the shoe.

Clause 86: The indicator of clause 85, wherein the indictor is located in an ethylene-vinyl-acetate layer of the shoe.

Clause 87: The indicator of any one of clauses 1 to 86, wherein the indicator is located on an inner area of the shoe.

Clause 88: The indicator of any one of clauses 1 to 87, wherein the indicator is located on an outer area of the shoe.

Clause 89: The indicator of any one of clauses 1 to 88, wherein the indicator is located within an area of the shoe.

Clause 90: The indicator of any one of clauses 1 to 89, wherein the indicator is located on an outer area of the shoe that is behind a heel of the shoe.

Clause 91: A method of manufacturing an indicator for visualizing wear on a shoe, comprising, providing the indicator of any one of clauses 1 to 90, and affixing the indicator in an area of the shoe.

Clause 92: The method of clause 91, wherein the area of the shoe comprises a layer.

Clause 93: The method of clause 91, wherein the area of the shoe comprises an inner area.

Clause 94: The method of clause 91, wherein the area of the shoe comprises or an outer area.

Clause 95: The method of clause 91, wherein the area of the shoe comprises within the shoe.

Clause 96: The method of any one of clauses 91 to 95, wherein the area comprises an ethylene-vinyl-acetate layer of the shoe.

Clause 97: A method of using an indicator for visualizing wear on a shoe, comprising, providing the indicator of any one of clauses 1 to 90 affixed in an area of the shoe, and determining an expiration of the shoe.

Clause 98: The method of clause 97, wherein determining comprises engagement of the peg with the receiver.

DESCRIPTION OF THE INVENTION

Embodiments will now be described with reference to FIGS. 1 and 2A-2B, which relate to an indicator for visualizing wear on a shoe. Moreover, it is contemplated that while the present invention is disclosed hereinafter with respect to footwear, in particular a shoe or an athletic shoe, the present invention may be used in a variety of other footwear.

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of elements used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Figure 1:
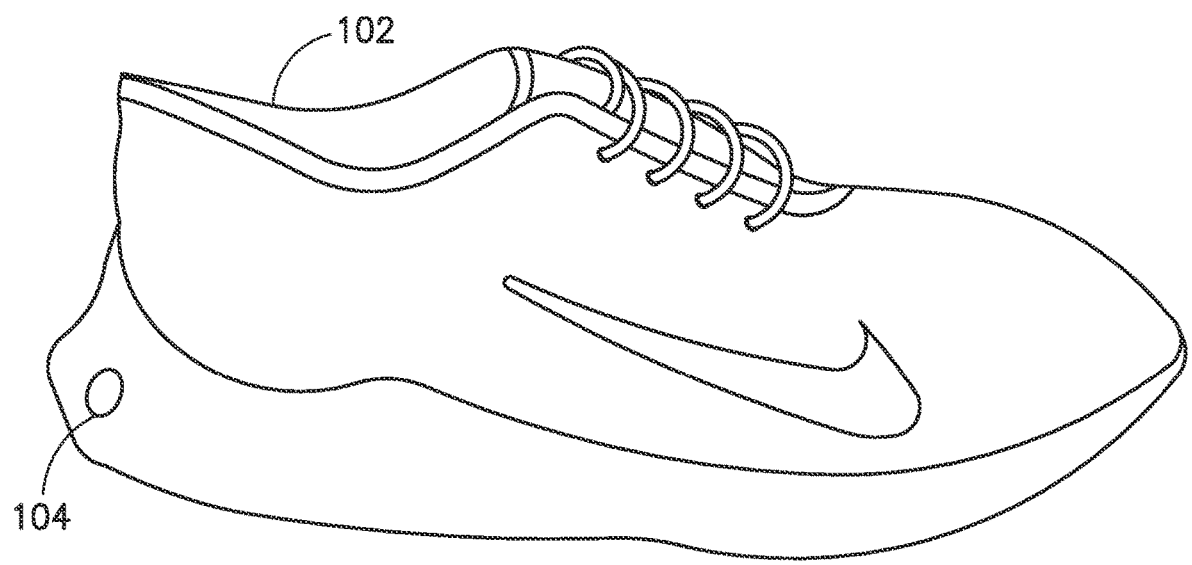
FIG. 1 is an illustration of an embodiment of an indicator for visualizing wear on a shoe depicting the indicator can be located on the outer area of the shoe.

FIG. 1 is a perspective view of a shoe 102 capable of being used with an indicator 104 for visualizing wear on the shoe 102. In some embodiments, the indicator 104 can be located on an outer area of the shoe 102 as depicted in FIG. 1, for example, on an outer area of the heel, sole, or mid-sole of the shoe 102. It is contemplated herein, that in some embodiments, the indicator 104 can be located on an inner area of the shoe 102, for example, on an inner area of the heel, sole, or mid-sole of the shoe 102. In some embodiments, the indicator 104 can be located within an area of the shoe 102, for example, within the heel, sole, or mid-sole of the shoe 102. In some embodiments, the indicator 104 can be located on an outer area of the shoe 102 and/or within the heel, sole, or mid-sole of the shoe 102. In some embodiments, the indicator 104 can be located on an inner area of the shoe 102 and/or within the heel, sole, or mid-sole of the shoe 102. In further embodiments contemplated herein, the indicator 104 can be located on an outer area of the shoe 102 that is behind a heel, sole, or mid-sole of the shoe 102.

In further embodiments, the indicator 104 can be constructed as part of the heel, sole, or mid-sole of shoe 102, and/or visible on the bottom of the shoe. In some embodiments, the indicator 104 can be constructed as part of the heel, sole, or mid-sole of shoe 102, and/or visible on an outer area of the shoe, for example, an outer area of the heel, sole, or mid-sole of the shoe. In some embodiments, the indicator 104 can be constructed as part of the heel, sole, or mid-sole of shoe 102, and/or visible on an inner area of the shoe, for example, on an inner area of the heel, sole, or mid-sole of the shoe.

In some embodiments, the indicator 104 can be an insert which is used in place of the insole, or is placed on top of the insole so as to be visible within the shoe 102.

In some embodiments, the indicator can be located in a layer of the shoe. In some embodiments, the indicator is located in an ethylene-vinyl-acetate layer of the shoe.

Figure 2A:
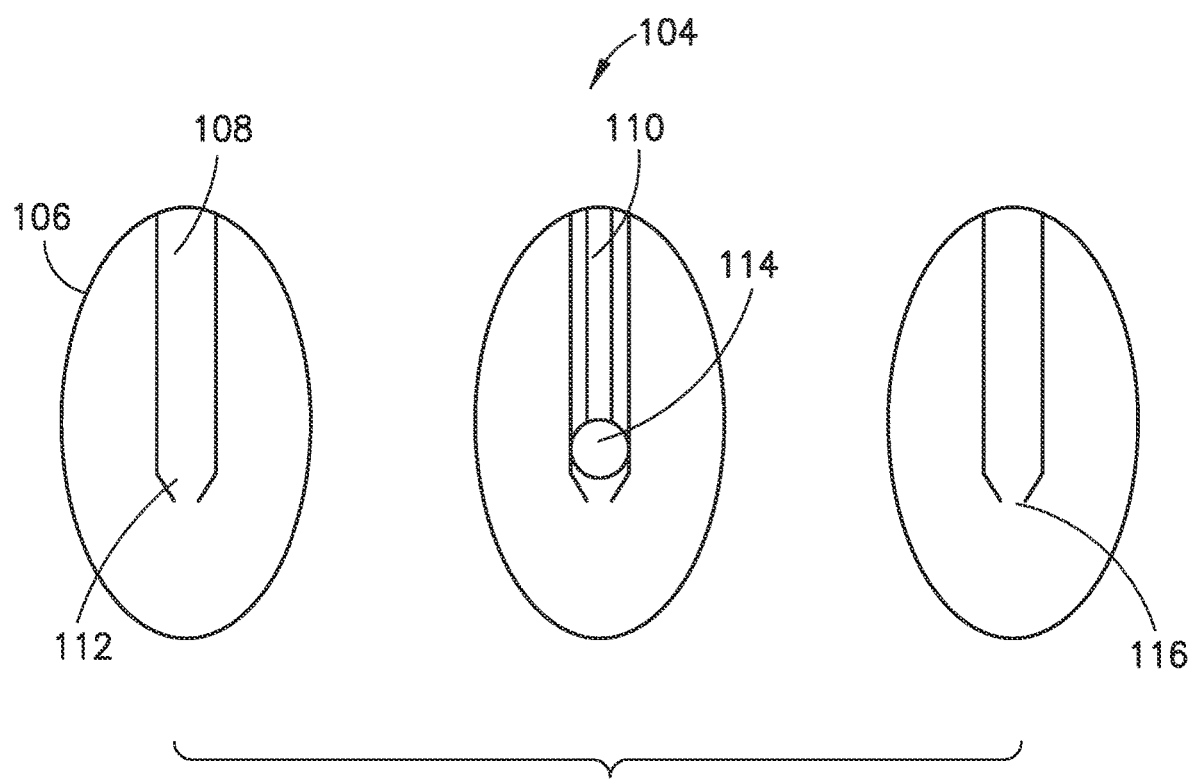
FIGS. 2A-2B is an illustration of an embodiment of an indicator for visualizing wear on a shoe depicting the indicator with a housing having a tube, a peg, a receiver, an engagement portion, and an air pocket.

Referring to FIG. 2A, in some embodiments, the indicator 104 may include a housing 106 having a tube 108, the tube 108 having a top portion and a bottom portion and generally located within the housing. In some embodiments, a peg 110 can be in contact with at least a portion of the top portion of the tube 108. In further embodiments, a receiver 112 can be in contact with at least a portion of the bottom portion of the tube. In some embodiments, the peg 110 may include a top portion and a bottom portion. In some embodiments, the bottom portion of the peg 110 may have an engagement portion 114. In some embodiments, the housing 106 may have an air pocket generally depicted at 116 of FIG. 2A. It is contemplated herein that the shapes or geometries of the housing 106, tube 108, peg 110, receiver 112, engagement portion 114, and air pocket 116 are depicted by way of example only and may vary in alternative embodiments.

In some embodiments, the housing 106 can be formed from a variety of materials suitable for its intended purpose. In some embodiments, the housing can be formed from a material including, but not limited to, polymers, copolymers, ethyl vinyl acetate, polyurethane, thermoplastic urethane, nylon, or combinations thereof. In some embodiments, the housing can be formed from plastic.

In some embodiments, the tube 108 can be formed from a variety of materials suitable for its intended purpose. In some embodiments, the tube can be formed from a material including, but not limited to, polymers, copolymers, ethyl vinyl acetate, polyurethane, thermoplastic urethane, nylon, or combinations thereof.

In some embodiments, the peg 110 can be formed from a variety of materials suitable for its intended purpose. In some embodiments, the peg can be formed from a material including, but not limited to, polymers, copolymers, ethyl vinyl acetate, polyurethane, thermoplastic urethane, nylon, or combinations thereof.

In some embodiments, the receiver 112 can be formed from a variety of materials suitable for its intended purpose. In some embodiments, the receiver can be formed from a material including, but not limited to, polymers, copolymers, ethyl vinyl acetate, polyurethane, thermoplastic urethane, nylon, or combinations thereof.

In some embodiments, the housing 106 has a dimension. In some embodiments, the housing dimension is in a range from about 0.3 centimeters to about 5.0 centimeters in length, from about 0.3 centimeters to about 4.0 centimeters in length, from about 0.3 centimeters to about 3.0 centimeters in length, from about 0.3 centimeters to about 2.0 centimeters in length, from about 0.3 centimeters to about 1.0 centimeters in length, or from about 0.3 centimeters to about 0.5 centimeters in length. In some embodiments, the housing dimension is in a range from about 0.5 centimeter to about 5.0 centimeters, from about 1.0 centimeter to about 5.0 centimeters, from about 2.0 centimeter to about 5.0 centimeters, from about 3.0 centimeter to about 5.0 centimeters, from about 4.0 centimeter to about 5.0 centimeters. In some embodiments, the housing dimension is about 0.3 centimeter, 0.5 centimeters, 1.0 centimeters, 2.0 centimeters, 3.0 centimeters, 4.0 centimeters, or 5.0 centimeters.

In some embodiments, the tube 108 has a dimension. In some embodiments, the tube has a dimension in a range from about 0.2 centimeters to about 2.0 centimeters, from about 0.2 centimeters to about 1.5 centimeters, from about 0.2 centimeters to about 1.0 centimeters, or from about 0.2 centimeters to about 0.5 centimeters. In some embodiments, the tube has a dimension in a range from about 0.5 centimeters to about 2.0 centimeters, from about 1.0 centimeters to about 2.0 centimeters, or from about 1.5 centimeters to about 2.0 centimeters. In some embodiments, the tube dimension is about 0.2 centimeters, 0.5 centimeters, 1.0 centimeters, 1.5 centimeters, or 2.0 centimeters.

In some embodiments, the peg 110 has a dimension. In some embodiments, the peg has a dimension in a range from about 0.2 centimeters to about 3.0 centimeters, from about 0.2 centimeters to about 2.0 centimeters, from about 0.2 centimeters to about 1.0 centimeters, or from about 0.2 centimeters to about 0.5 centimeters. In some embodiments, the peg has a dimension in a range from about 0.5 centimeters to about 3.0 centimeters, from about 1.0 centimeters to about 3.0 centimeters, from about 1.5 centimeters to about 3.0 centimeters, from about 2.0 centimeters to about 3.0 centimeters, or from about 2.5 centimeters to about 3.0 centimeters. In some embodiments, the peg dimension is about 0.2 centimeters, 0.5 centimeters, 1.0 centimeters, 1.5 centimeters, 2.0 centimeters, 2.5 centimeters, or 3.0 centimeters.

In some embodiments, the receiver 112 has a dimension. In some embodiments, the receiver has a dimension in a range from about 0.3 centimeters to about 2.5 centimeters, from about 0.3 centimeters to about 2.0 centimeters, from about 0.3 centimeters to about 1.5 centimeters, from about 0.3 centimeters to about 1.0 centimeters, or from about 0.3 centimeters to about 0.5 centimeters. In some embodiments, the receiver has a dimension in a range from about 0.5 centimeters to about 2.5 centimeters, from about 1.0 centimeters to about 2.5 centimeters, from about 1.5 centimeters to about 2.5 centimeters, or from about 2.0 centimeters to about 2.5 centimeters. In some embodiments, the receiver dimension is about 0.3 centimeters, 0.5 centimeters, 1.0 centimeters, 1.5 centimeters, 2.0 centimeters, or 2.5 centimeters.

In some embodiments, the peg 110 has one or more colors. In some embodiments, the peg color is red, orange, yellow, green, blue, or a combination thereof. In some embodiments, the peg color is green. In further embodiments, the engagement portion 114 has one or more colors. In some embodiments, the engagement portion color is red, orange, yellow, green, blue, or a combination thereof. In some embodiments, the engagement portion color is red.

Figure 2B:
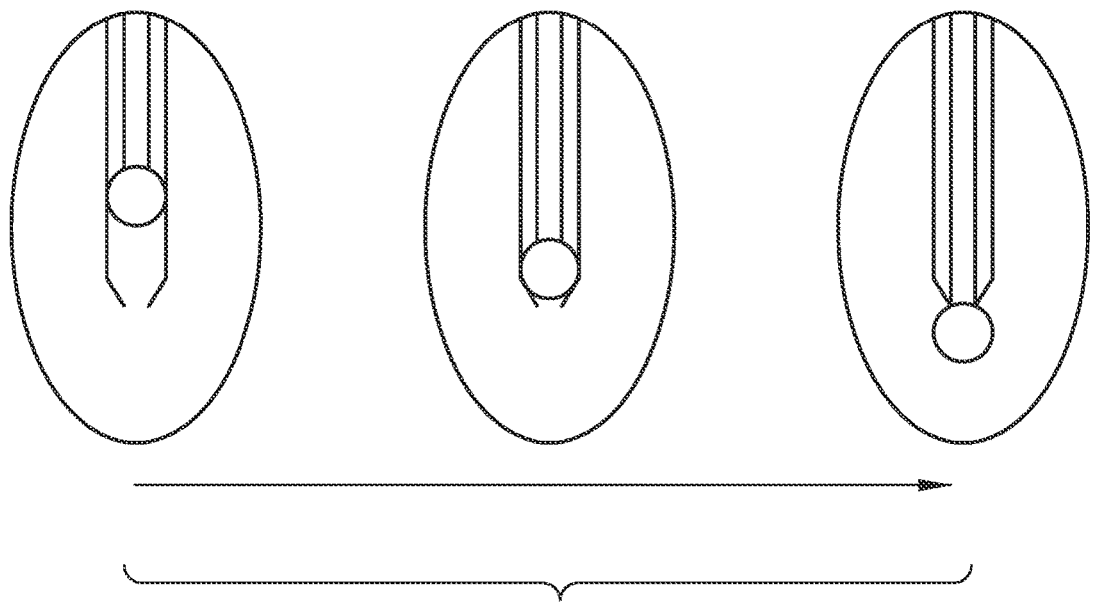

Referring to FIG. 2B, in some embodiments, indicator 104 can be used in footwear (e.g., a shoe or athletic shoe) for visualizing wear on the footwear/shoe or expiration of the footwear/shoe. As depicted in FIG. 2B, indicator 104 is located on, attached to, affixed, or placed within the shoe (e.g., on an outer area of the heel, sole, or mid-sole of the shoe). Peg 110 of indicator 104 has an engagement portion 114, and the peg with the engagement portion is placed within the top portion of tube 108. Upon use of the footwear or shoe, compression exerted by the user onto the footwear or shoe may provide force allowing peg 110 and engagement portion 114 to interact with the bottom portion of tube 108 over time (depicted as the arrow moving left to right in FIG. 2B). Over time, engagement portion 114 of peg 110 will interact with, or contact, at least a portion of receiver 112 located in the bottom portion of tube 108. This interaction of the engagement portion with the receiver may allow the user of the footwear or shoe to determine the expiration of the footwear or shoe.

A method of manufacturing an indicator for visualizing wear on a shoe is also contemplated within the scope of the present invention. As contemplated herein, the indicator 104 can be constructed as part of the heel, sole, or mid-sole of shoe 102, and/or visible on the bottom of the shoe. In some embodiments, the indicator 104 can be constructed as part of the heel, sole, or mid-sole of shoe 102, and/or visible on an outer area of the shoe, for example, an outer area of the heel, sole, or mid-sole of the shoe. In some embodiments, the indicator 104 can be constructed as part of the heel, sole, or mid-sole of shoe 102, and/or visible on an inner area of the shoe, for example, on an inner area of the heel, sole, or mid-sole of the shoe. In some embodiments, the indicator 104 can be an insert which is used in place of the insole, or is placed on top of the insole so as to be visible within the shoe 102. In some embodiments, the indicator can be located in a layer of the shoe. In some embodiments, the indicator is located in an ethylene-vinyl-acetate layer of the shoe. As further contemplated here, the housing, tube, peg, and/or receiver can be formed from a variety of materials suitable for its intended purpose. In some embodiments, the housing, tube, peg, and/or receiver can be formed from a material including, but not limited to, polymers, copolymers, ethyl vinyl acetate, polyurethane, thermoplastic urethane, nylon, or combinations thereof. In some embodiments, the housing, tube, peg, and/or receiver can be formed from plastic.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise.

About" as used herein means ±10% of the referenced value. In certain embodiments, "about" means ±9%, or ±8%, or ±7%, or ±6%, or ±5%, or ±4%, or ±3%, or ±2% or ±1% of the referenced value.

The invention claimed is:

1. An indicator for visualizing wear on a shoe, comprising:
  a housing having a tube, the tube having a top portion and a bottom portion;
  a peg in contact with at least a portion of the top portion of the tube; and a receiver in contact with at least a portion of the bottom portion of the tube.

2. The indicator of claim 1, wherein the peg comprises a top portion and a bottom portion, the bottom portion having an engagement portion.

3. The indicator of claim 1, wherein the housing comprises an air pocket.

4. The indicator of claim 1, wherein the housing comprises a material selected from the group consisting of polymers, copolymers, ethyl vinyl acetate, polyurethane, thermoplastic urethane, nylon, and combinations thereof.

5. The indicator of claim 4, wherein the material is plastic.

6. The indicator of claim 1, wherein the tube comprises a material selected from the group consisting of polymers, copolymers, ethyl vinyl acetate, polyurethane, thermoplastic urethane, nylon, and combinations thereof.

7. The indicator of claim 1, wherein the peg comprises a material selected from the group consisting of polymers, copolymers, ethyl vinyl acetate, polyurethane, thermoplastic urethane, nylon, and combinations thereof.

8. The indicator of claim 1, wherein the receiver comprises a material selected from the group consisting of polymers, copolymers, ethyl vinyl acetate, polyurethane, thermoplastic urethane, nylon, and combinations thereof.

9. The indicator of claim 1, wherein the housing has a dimension in a range from about 0.3 centimeters to about 5.0 centimeters in length.

10. The indicator of claim 1, wherein the tube has a dimension in a range from about 0.2 centimeters to about 2.0 centimeters.

11. The indicator of claim 1, wherein the peg has a dimension in a range from about 0.2 centimeters to about 3.0 centimeters.

12. The indicator of claim 1, wherein the receiver has a dimension in a range from about 0.3 centimeters to about 2.5 centimeters.

13. The indicator of claim 1, wherein the peg has one or more colors, the one or more colors selected from the group consisting of red, orange, yellow, green, blue, and a combination thereof.

14. The indicator of claim 1, wherein the indicator is located in a layer of the shoe, optionally an ethylene-vinyl-acetate layer of the shoe.

15. The indicator of claim 1, wherein the indicator is located on an inner or outer area of the shoe.

16. The indicator of claim 1, wherein the indicator is located within an area of the shoe.

17. The indicator of claim 1, wherein the indicator is located on an outer area of the shoe that is behind a heel of the shoe.

18. A method of manufacturing an indicator for visualizing wear on a shoe, the method comprising the steps of:
providing the indicator of claim 1; and
affixing the indicator in an area of the shoe.

19. The method of claim 18, wherein the area comprises a layer, an inner or an outer area, or within the shoe.

20. The method of claim 18, wherein the area comprises an ethylene-vinyl-acetate layer of the shoe.

21. A method of using an indicator for visualizing wear on a shoe, the method comprising the steps of:
providing the indicator of claim 1 affixed in an area of the shoe; and
determining an expiration of the shoe.

22. The method of claim 21, wherein determining comprises engagement of the peg with the receiver.

* * * * *